(12) United States Patent
Kobayashi et al.

(10) Patent No.: US 12,493,343 B2
(45) Date of Patent: Dec. 9, 2025

(54) MOTION STATE MONITORING SYSTEM, METHOD FOR CONTROLLING THE SAME, AND NON-TRANSITORY COMPUTER-READABLE MEDIUM

(71) Applicant: TOYOTA JIDOSHA KABUSHIKI KAISHA, Toyota (JP)

(72) Inventors: Makoto Kobayashi, Nisshin (JP); Takeru Fukagawa, Kariya (JP); Hidetaka Sasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/825,212

(22) Filed: Sep. 5, 2024

(65) Prior Publication Data
US 2025/0130627 A1    Apr. 24, 2025

(30) Foreign Application Priority Data

Oct. 24, 2023 (JP) .................................. 2023-182855

(51) Int. Cl.
*G06F 3/01* (2006.01)
*A61B 5/00* (2006.01)
(Continued)

(52) U.S. Cl.
CPC ............ *G06F 3/011* (2013.01); *A61B 5/0024* (2013.01); *A61B 5/11* (2013.01); *A61B 5/1114* (2013.01);
(Continued)

(58) Field of Classification Search
CPC ............ G06F 3/011–017; G06F 3/048; G06F 3/0482; G06F 3/0484–04845;
(Continued)

(56) References Cited

U.S. PATENT DOCUMENTS

2011/0006926 A1* 1/2011 Kim .................. A63B 24/0003
                                                              341/20
2014/0303524 A1* 10/2014 Chen .................. A61B 5/7225
                                                              600/595
(Continued)

FOREIGN PATENT DOCUMENTS

JP      2022-034407 A      3/2022
JP      2022-034448 A      3/2022
(Continued)

*Primary Examiner* — Patrick F Marinelli
(74) *Attorney, Agent, or Firm* — Oliff PLC

(57) ABSTRACT

A motion state monitoring system according to the present disclosure is a motion state monitoring system configured to monitor a motion of a subject in accordance with a result of detection sent from each of a plurality of sensors corresponding to a plurality of respective body parts of a body of the subject, the motion state monitoring system including: a storage unit configured to store a motion to be monitored and an attachment position at which the sensor is to be attached, the motion being made to correspond to the attachment position; and a display control unit configured to refer to the storage unit and display the attachment position at which the sensor is to be attached on a diagram showing a human body, the attachment position being determined in accordance with a specified motion to be monitored.

6 Claims, 6 Drawing Sheets

(51) Int. Cl.
*A61B 5/11* (2006.01)
*G06F 3/04817* (2022.01)
*G06F 3/0486* (2013.01)
*G06F 3/04883* (2022.01)

(52) U.S. Cl.
CPC .......... *A61B 5/742* (2013.01); *G06F 3/04817* (2013.01); *G06F 3/0486* (2013.01); *A61B 2560/0223* (2013.01); *A61B 2562/04* (2013.01); *G06F 3/015* (2013.01); *G06F 3/04883* (2013.01)

(58) Field of Classification Search
CPC .. G06F 3/0486; G06F 3/0488; G06F 3/04883; A61B 5/0024; A61B 5/1114; A61B 5/742; A61B 5/11; A61B 2562/04; A61B 2560/0223
See application file for complete search history.

(56) References Cited

U.S. PATENT DOCUMENTS

| | | | |
|---|---|---|---|
| 2016/0081625 | A1* | 3/2016 | Kim ........................ H04W 4/70 600/595 |
| 2022/0054042 | A1* | 2/2022 | Kobayashi ........... A61B 5/0024 |
| 2022/0054044 | A1* | 2/2022 | Kobayashi ............. G16H 40/63 |
| 2022/0054045 | A1* | 2/2022 | Kobayashi .............. G16H 50/30 |
| 2022/0057233 | A1* | 2/2022 | Kobayashi .............. G06F 3/011 |
| 2025/0127421 | A1* | 4/2025 | Kobayashi .......... G06F 3/04817 |
| 2025/0127423 | A1* | 4/2025 | Kobayashi ............... A61B 5/11 |
| 2025/0130627 | A1* | 4/2025 | Kobayashi .......... G06F 3/04817 |
| 2025/0130683 | A1* | 4/2025 | Kobayashi .......... G06F 3/04817 |

FOREIGN PATENT DOCUMENTS

| | | |
|---|---|---|
| JP | 2022-034449 A | 3/2022 |
| JP | 2022-034450 A | 3/2022 |

* cited by examiner

MOTION STATE MONITORING SYSTEM, METHOD FOR CONTROLLING THE SAME, AND NON-TRANSITORY COMPUTER-READABLE MEDIUM

CROSS REFERENCE TO RELATED APPLICATIONS

This application is based upon and claims the benefit of priority from Japanese patent application No. 2023-182855, filed on Oct. 24, 2023, the disclosure of which is incorporated herein in its entirety by reference.

BACKGROUND

The present disclosure relates to a motion state monitoring system, a method for controlling the same, and a control program.

Japanese Unexamined Patent Application Publication No. 2022-34448 discloses a motion state monitoring system that monitors a motion state of a subject based on a result of detection by a plurality of sensors attached to a plurality of respective body parts of a body of the subject.

SUMMARY

In the motion state monitoring system as disclosed in the related art, it is difficult to determine where an attachment position at which a sensor corresponding to an object to be measured is to be attached is.

The present disclosure has been made in view of the aforementioned circumstances and an object thereof is to provide a motion state monitoring system, a method for controlling the same, and a control program which enable a user to easily determine where an attachment position at which a sensor is to be attached is and then attach the sensor thereat.

A motion state monitoring system according to the present disclosure is a motion state monitoring system configured to monitor a motion of a subject in accordance with a result of detection sent from each of a plurality of sensors attached to a plurality of respective body parts of a body of the subject, the motion state monitoring system including:
a storage unit configured to store a motion to be monitored and an attachment position at which the sensor is to be attached, the motion being made to correspond to the attachment position; and
a display control unit configured to refer to the storage unit and display the attachment position at which the sensor is to be attached on a diagram showing a human body, the attachment position being determined in accordance with a specified motion to be monitored.

The motion state monitoring system may further include a processing unit configured to make the attachment position correspond to the sensor based on an operation input for the displayed attachment position.

The operation input may be an operation input for dragging and dropping a sensor icon corresponding to the sensor onto the displayed attachment position.

The motion state monitoring system may further include a specification unit configured to specify the motion to be monitored in response to an operation input for a joint in the diagram showing a human body.

When a plurality of motions to be monitored including a first motion to be monitored and a second motion to be monitored are specified, the display control unit may display a first attachment position determined in accordance with the first motion to be monitored and a second attachment position determined in accordance with the second motion to be monitored in display forms different from each other.

The display control unit may move the diagram showing a human body based on a captured image of the subject.

The motion state monitoring system may further include a specification unit configured to extract a feature of a motion from the captured image of the subject using a machine learning model and specify a motion corresponding to the feature as the motion to be monitored.

The motion state monitoring system may further include a specification unit configured to specify the motion to be monitored based on an attachment position history of the sensor.

A method for controlling a motion state monitoring system according to the present disclosure is a method for controlling a motion state monitoring system configured to monitor a motion of a subject in accordance with a result of detection sent from each of a plurality of sensors attached to a plurality of respective body parts of a body of the subject, the method including
referring to a storage unit configured to store a motion to be monitored and an attachment position at which the sensor is to be attached, the motion being made to correspond to the attachment position, and displaying the attachment position at which the sensor is to be attached on a diagram showing a human body, the attachment position being determined in accordance with a specified motion to be monitored.

A control program according to the present disclosure is a control program for causing a computer to execute control processing in a motion state monitoring system configured to monitor a motion of a subject in accordance with a result of detection sent from each of a plurality of sensors attached to a plurality of respective body parts of a body of the subject, the control processing including
referring to a storage unit configured to store a motion to be monitored and an attachment position at which the sensor is to be attached, the motion being made to correspond to the attachment position, and displaying the attachment position at which the sensor is to be attached on a diagram showing a human body, the attachment position being determined in accordance with a specified motion to be monitored.

According to the present disclosure, it is possible to provide a motion state monitoring system, a method for controlling the same, and a control program which enable a user to easily determine where an attachment position at which a sensor is to be attached is and then attach the sensor thereat.

The above and other objects, features and advantages of the present disclosure will become more fully understood from the detailed description given hereinbelow and the accompanying drawings.

DESCRIPTION OF EMBODIMENTS

Figure 1:
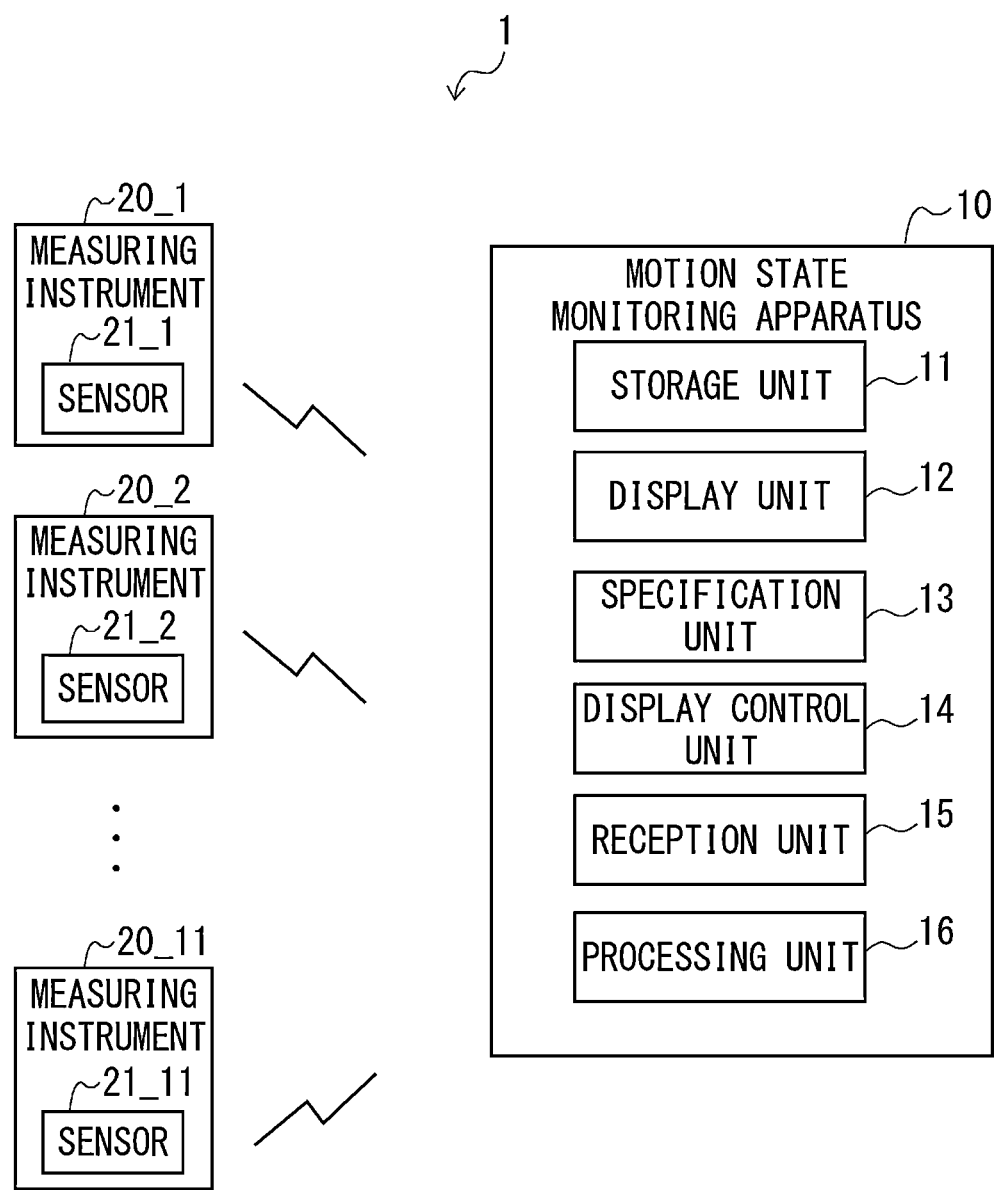
FIG. 1 is a block diagram showing an example of a configuration of a motion state monitoring system according to a first embodiment.

The present disclosure will be described hereinafter through embodiments of the present disclosure. However, the disclosure according to the claims is not limited to the following embodiments. Further, all the components/structures described in the embodiment are not necessarily essential as means for solving the problem. For the clarification of the description, the following descriptions and the drawings are partially omitted and simplified as appropriate. The same elements are denoted by the same reference numerals or symbols throughout the drawings, and redundant descriptions are omitted as necessary.

First Embodiment

FIG. 1 is a block diagram showing a configuration example of a motion state monitoring system 1 according to first embodiment. The motion state monitoring system 1 is a system that monitors a motion state of a subject. By a result of the monitoring, for example, a user, such as an assistant, can provide support for making the motion of the subject close to a desired motion. The details thereof will be described below.

As shown in FIG. 1, the motion state monitoring system 1 includes a motion state monitoring apparatus 10 and a plurality of measuring instruments 20. The motion state monitoring apparatus 10 itself can be referred to as a motion state monitoring system. The motion state monitoring apparatus 10 and the plurality of measuring instruments 20 are configured so that they can communicate with each other through a wired or wireless network. Note that the motion state monitoring apparatus 10 and the plurality of measuring instruments 20 may perform radio communication conforming to the Bluetooth (registered trademark) standard, and short-range radio communication conforming to Near Field Communication (NFC), Ultra Wideband (UWB), WiFi (registered trademark), or the like. In this embodiment, an example of a case in which 11 of the measuring instruments 20 are provided will be described. In the following description, the 11 measuring instruments 20 are also referred to as measuring instruments 20_1 to 20_11, respectively, in order to distinguish them from each other.

The measuring instruments 20_1 to 20_11 are respectively attached to body parts p1 to p11 of a subject P from which motions are to be detected among various body parts of the body of the subject P, and detect the motions of the respective body parts p1 to p11 by using motion sensors (hereinafter simply referred to as sensors) 21_1 to 21_11 composed of gyro sensors, acceleration sensors, and the like. Note that the measuring instruments 20_1 to 20 11 are made to correspond to the respective body parts p1 to p11 by pairing processing performed with the motion state monitoring apparatus 10.

Figure 2:
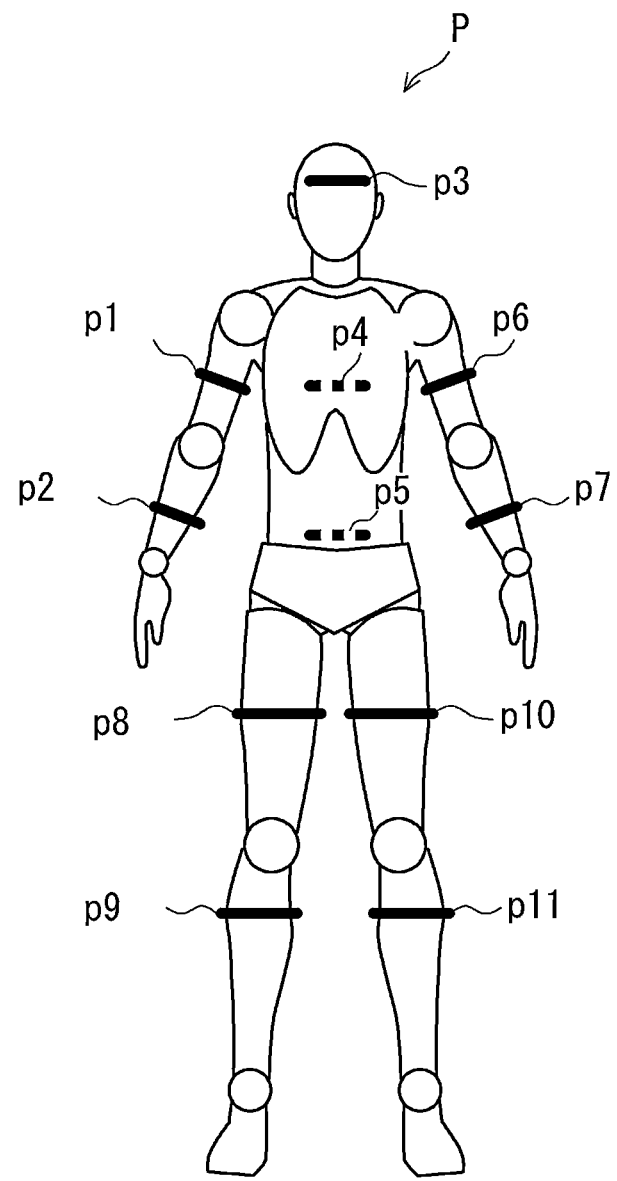
FIG. 2 is a diagram showing an example of body parts of a subject to which measuring instruments are to be attached.

FIG. 2 is a diagram showing an example of body parts of the subject P to which the measuring instruments 20_1 to 20_11 are to be attached. In the example shown in FIG. 2, the body parts p1 to p11 to which the respective measuring instruments 20_1 to 20_11 are to be attached are a right upper arm, a right forearm, a head, a chest (a trunk), a waist (a pelvis), a left upper arm, a left forearm, a right thigh, a right lower leg, a left thigh, and a left lower leg, respectively.

Note that it is not necessary to attach all of the measuring instruments 20_1 to 20_11 to the body of the subject P. It is only necessary to attach, among the measuring instruments 20_1 to 20_11, only the measuring instrument(s) required to measure a motion to be monitored (including the movement of the body part) which a user wants to monitor to the body of the subject P.

Examples of the motion to be monitored include motions such as bending and stretching of the right shoulder, adduction and abduction of the right shoulder, internal and external rotation of the right shoulder, bending and stretching of the right elbow, pronation and supination of the right forearm, bending and stretching of the head, rotation of the head, bending and stretching of the chest and the waist, rotation of the chest and the waist, lateral bending of the chest and the waist, bending and stretching of the left shoulder, adduction and abduction of the left shoulder, internal and external rotation of the left shoulder, bending and stretching of the left elbow, and pronation and supination of the left forearm. Further, the motion to be monitored includes movement of the body part to which a sensor is attached.

The motion to be monitored also includes, for example, an angle of the joint of the body of the subject P to be measured based on results of the detection by a plurality of sensors and an angle of the joint in any coordinate system to be measured based on a result of the detection by one of the sensors. The motion to be monitored may be specified by a user such as an assistant.

In this example, it is assumed that a bending and stretching motion of the right elbow of the subject P is monitored. The bending and stretching motion of the right elbow can be measured based on a result of the detection by each of the sensor attached to the right upper arm (the body part p1) and the sensor attached to the right forearm (the body part p2). In this case, for example, one measuring instrument is attached to the right upper arm (the body part p1) while a different measuring instrument is attached to the right forearm (the body part p2) of the subject P.

Note that a user may select a plurality of different motions to be monitored simultaneously. For example, a user may select the "bending and stretching of the right elbow" and the "internal and external rotation of the right shoulder", or select the "bending and stretching of the left elbow" and the "internal and external rotation of the left shoulder".

It is possible to measure the bending and stretching motion of the right elbow based on a result of the detection by each of the sensors attached to the right upper arm (the body part p1) and the right forearm (the body part p2). Similarly, it is possible to measure the internal and external rotation motion of the right shoulder based on the result of the detection by each of the sensors attached to the right upper arm (the body part p1) and the right forearm (the body part p2). Further, it is possible to measure the bending and stretching motion of the left elbow based on a result of the detection by each of the sensors attached to the left upper arm (the body part p6) and the left forearm (the body part p7). Similarly, it is possible to measure the internal and external rotation motion of the left shoulder based on the result of the detection by each of the sensors attached to the left upper arm (the body part p6) and the left forearm (the body part p7).

Examples of Configurations of Measuring Instruments 20_1 to 20_11

Figure 3:
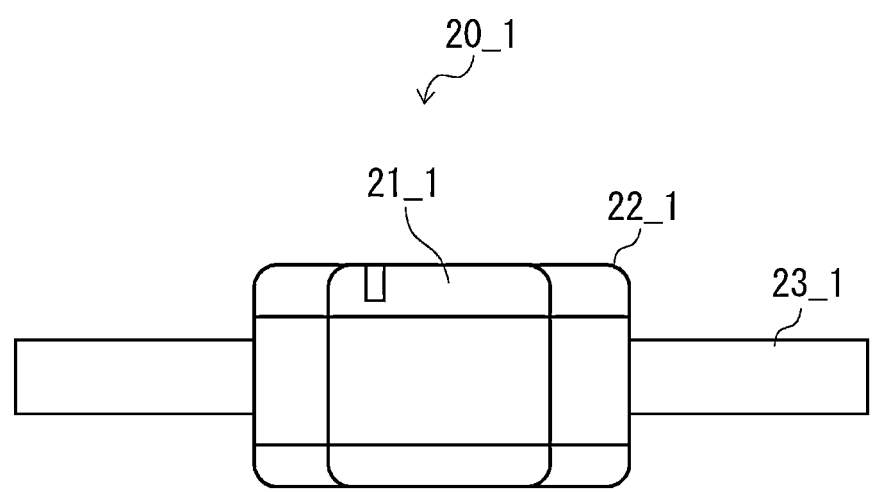
FIG. 3 is a diagram showing an example of a configuration of the measuring instrument provided in the motion state monitoring system according to the first embodiment.

FIG. 3 is a diagram showing an example of a configuration of the measuring instrument 20_1. Note that the configuration of each of the measuring instruments 20_2 to 20_11 is similar to that of the measuring instrument 20_1, and thus the descriptions thereof will be omitted.

As shown in FIG. 3, the measuring instrument 20_1 includes the sensor 21_1, an attachment pad 22_1, and a belt 23_1. The belt 23_1 is configured so that it can be wound around the body part of the subject P from which a motion is to be detected. The sensor 21_1 is integrated with, for example, the attachment pad 22_1. The attachment pad 22_1 with which the sensor 21_1 is integrated is configured so that it can be attached to or detached from the belt 23_1.

Figure 4:
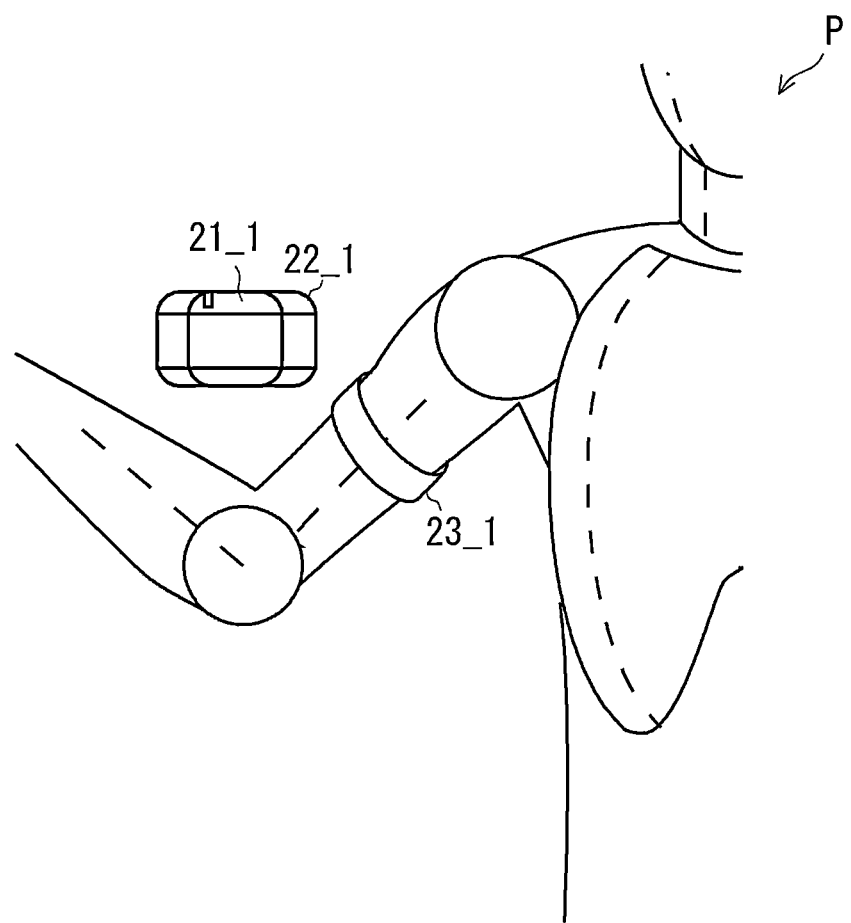
FIG. 4 is a diagram showing an example of how to attach the measuring instruments shown in FIG. 3 to a subject.

FIG. 4 is a diagram showing an example of how to attach the measuring instrument 20_1 to the subject P. In the example shown in FIG. 4, the belt 23_1 is wound around the right upper arm (the body part p1) which is one of the body parts of the subject P from which motions are to be detected. The sensor 21_1 is attached to the belt 23_1 with the attachment pad 22_1 interposed therebetween after processing for making the sensor 21_1 correspond to the body part to which it is to be attached, a calibration of the sensor 21_1, and the like have been completed.

Example of Configuration of Motion State Monitoring Apparatus 10

The motion state monitoring apparatus 10 is an apparatus that outputs a result of a calculation indicating a motion state of the subject P based on results (sensing values) of detection by the sensors 21_1 to 21_11. The motion state monitoring apparatus 10 may be, for example, one of a Personal Computer (PC), a mobile phone terminal, a smartphone, and a tablet terminal. The motion state monitoring apparatus 10 may be configured so that it can communicate with the sensors 21_1 to 21_11 through a network (not shown). The motion state monitoring apparatus 10 can also be referred to as a motion state monitoring system. The motion state monitoring apparatus 10 may include a processor and a memory storing various types of control programs. In this case, the motion state monitoring apparatus 10 has a function as a computer and performs processing based on various types of control programs etc.

As shown in FIG. 1, the motion state monitoring apparatus 10 includes a storage unit 11, a display unit 12, a specification unit 13, a display control unit 14, a reception unit 15, and a processing unit 16.

The storage unit 11 is implemented by a storage device that is accessible by a computer. In the storage unit 11, a motion to be monitored and an attachment position where a sensor is to be attached are made to correspond to each other and stored. For example, the bending and stretching motion of the right elbow is made to correspond to the right upper arm (the body part p1) and the right forearm (the body part p2).

Figure 5:
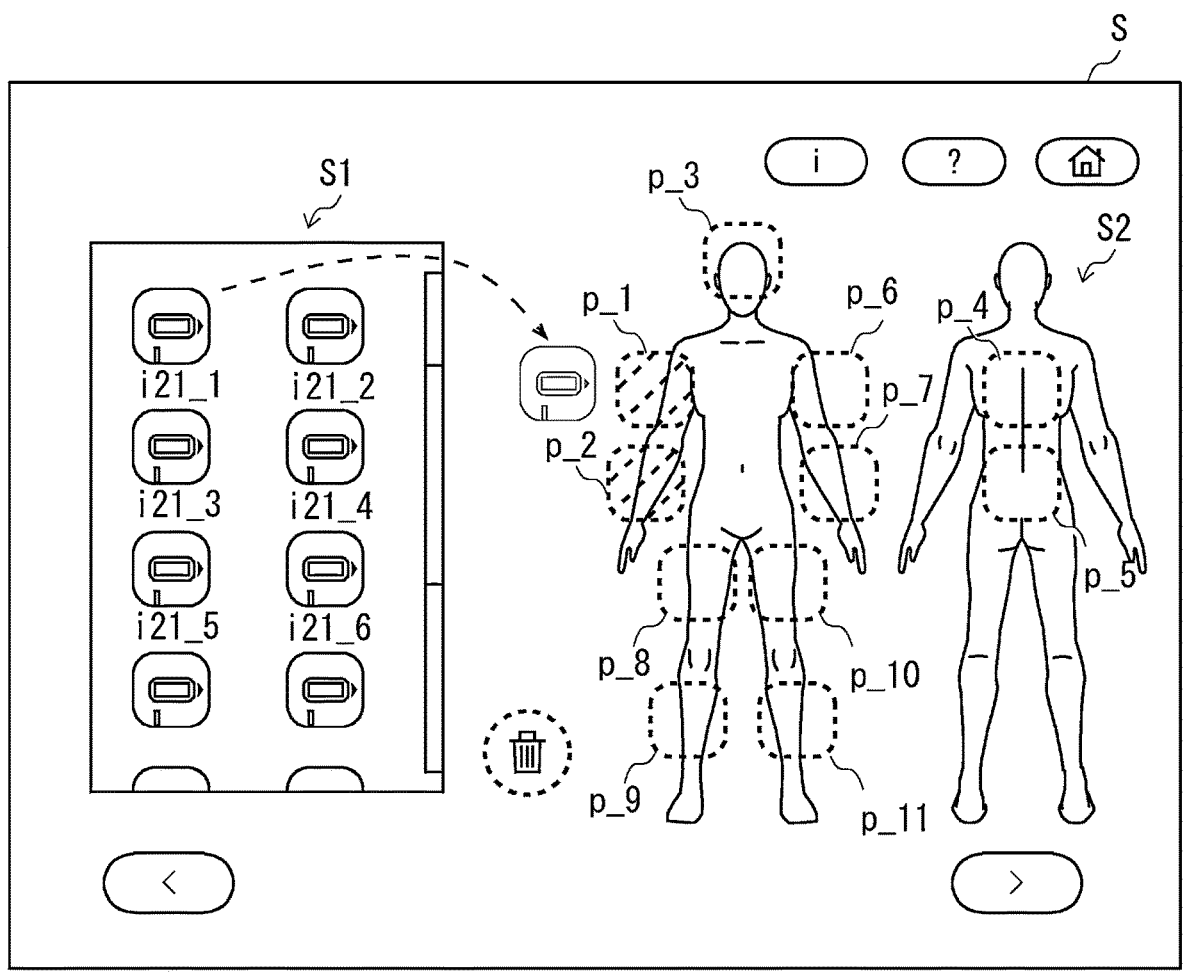
FIG. 5 is a diagram showing an example of a display screen.

The display unit 12, which is, for example, a display apparatus, displays a plurality of sensor icons respectively corresponding to a plurality of the sensors 21_1 to 21_11. FIG. 5 shows an example of a display screen S displayed on the display unit 12. An area in the display screen S where the sensor icon is displayed is defined as a sensor icon display area S1. The display screen including the sensor icon display area S1 includes a human body schematic diagram S2 showing the body parts to which the respective sensors are to be attached. The display screen S shown in FIG. 5 is displayed when an operation for making one of the plurality of the sensors 21 correspond to one of the body parts p of the subject P to which the respective sensors 21 are to be attached in a one-to-one manner is performed.

In the example shown in FIG. 5, the front side and the back side of the human body are separately displayed. The body parts p1 to p11 of the subject P to which the respective sensors are to be attached shown in FIG. 2 respectively correspond to the body parts p_1 to p_11 shown in the human body schematic diagram S2 of FIG. 5. In the following description, the body parts p_1 to p_11 shown in the human body schematic diagram S2 will be referred to as a right upper arm, a right forearm, a head, a back (a trunk), a waist (a pelvis), a left upper arm, a left forearm, a right thigh, a right lower leg, a left thigh, and a left lower leg, respectively, as appropriate. Further, the display unit 12, for example, can graph the results of the calculation based on the results of the detection by each of one or more sensors and display them.

Referring to FIG. 1, the specification unit 13 specifies a motion to be monitored of the subject. The specification unit 13 may specify a plurality of motions to be monitored.

The specification unit 13 may specify a motion to be monitored in accordance with an input operation performed by a user. For example, when the display screen S includes a selection list in which motions to be monitored (e.g., bending and stretching of the right shoulder, adduction and abduction of the right shoulder) are listed, the specification unit 13 may specify a motion to be monitored selected by a user.

Further, the specification unit 13 may specify a motion to be monitored in accordance with the input operation to the joint in the human body schematic diagram S2. Specifically, the specification unit 13 may specify a motion to be monitored related to the joint tapped by a user. For example, when a user has tapped the right elbow in the human body schematic diagram S2, the specification unit 13 may specify a bending and stretching motion of the right elbow as the motion to be monitored. When there are a plurality of motions related to the joint tapped by a user, the specification unit 13 may further specify a motion to be monitored based on an input operation indicating the rotational direction of the joint or the like.

Further, the specification unit 13 may determine a motion to be monitored based on an attachment position history of the sensor. The specification unit 13 may specify a motion corresponding to the previous attachment position as the motion to be monitored, and may specify a motion corresponding to the attachment position at which the sensor has been attached the largest number of times as the motion to be monitored. Further, when there are a plurality of operations related to the joint tapped by a user, the specification unit 13 may specify a motion to be monitored by taking into account the attachment position history of the sensor.

The specification unit 13 may extract features of a motion from a captured image of the subject P using a machine learning model, and specify a motion corresponding to the features as the motion to be monitored. The subject P can specify the motion to be monitored by performing a motion similar to the motion to be monitored. Further, the specification unit 13 may specify a motion to be monitored based on information input by a user by voice or in the form of a text. In this case, the specification unit 13 may use a large-scale language model.

The display control unit 14 refers to the storage unit 11 and causes the display unit 12 to display an attachment body part (i.e., a body part to which a sensor is to be attached), which is made to correspond to the specified motion to be monitored. For example, the display control unit 14 may highlight (by a color, flashing, shading, etc.) the attachment body part made to correspond to the motion to be monitored so that it is displayed in a display form different from other body parts. When a plurality of motions to be monitored are specified, the display control unit 14 may display the attachment body part made to correspond to the first motion to be monitored (also referred to as the first body part) and the attachment body part made to correspond to the second motion to be monitored (also referred to as the second body part) in display forms (e.g., flashing speeds) different from each other. The display control unit 14 may make the thickness of a line surrounding the first body part different from the thickness of a line surrounding the second body part. Further, the display control unit 14 may make the sizes of the displayed body parts different from each other.

For example, when the bending and stretching motion of the right elbow is specified, p_1 corresponding to the right upper arm (the body part p1) and p_2 corresponding to the right forearm (the body part p2) are highlighted as shown in FIG. 5.

The display control unit 14 may move the human body schematic diagram S2 based on a captured image of the subject P. A user can easily determine the relationship between the human body schematic diagram S2 and the body of the subject P.

The plurality of sensor icons described above are selected by a user to make the sensors 21 correspond to the body parts p to which the respective sensors 21 are to be attached. The reception unit 15 receives a setting operation for the sensor icon displayed on the display unit 12. The setting operation is an input operation for the sensor icon for making the sensor corresponding to the sensor icon correspond to one of the body parts p to which the respective sensors 21 are to be attached. For example, a user moves a sensor icon i21_1 displayed in the sensor icon display area S1 to the right upper arm p_1 on the human body schematic diagram S2. Specifically, a user drags and drops the sensor icon i21_1 displayed in the sensor icon display area S1 onto the right upper arm p_1 of the human body schematic diagram S2 by a mouse operation, a touch operation, or the like. This setting operation is indicated by a dotted line in FIG. 5. In this way, the reception unit 15 receives the setting operation for the sensor icon performed by a user. Since p_1 and p_2 are highlighted, a user can smoothly perform the setting operation.

Referring to FIG. 1, the processing unit 16 makes the sensor corresponding to the sensor icon correspond to the body part of the subject P to which the sensor is to be attached in accordance with the setting operation. This processing for making the sensor correspond to the body part to which it is to be attached is performed by performing pairing between the motion state monitoring apparatus and the sensor 21 in advance and then associating identification information of 10 the body part p to which the sensor 21 is to be attached with identification information of the sensor 21 on the application of the motion state monitoring apparatus 10.

By displaying (e.g., highlighting) the attachment body part made to correspond to the motion to be monitored, the motion state monitoring system 1 according to the first embodiment enables a user to easily determine where the attachment position at which a sensor is to be attached is and then attach the sensor thereat.

Note that the setting operation is not limited to a drag-and-drop operation. The setting operation may be an operation input to the displayed attachment position. The reception unit 15 may receive the setting operation by a user clicking the sensor icon displayed in the sensor icon display area S1 and the body part to which the sensor is to be attached in the human body schematic diagram S2 within a predetermined time.

Further, the reception unit 15 may receive the setting operation by a user clicking the body part to which the sensor is to be attached in the human body schematic diagram S2. The processing unit 16 can automatically make one of the sensors corresponding to a plurality of respective sensor icons displayed on the display unit 12 correspond to the body part p of the subject P to which the sensor is to be attached in accordance with the above setting operation.

Operation of Motion State Monitoring Apparatus
10

Figure 6:
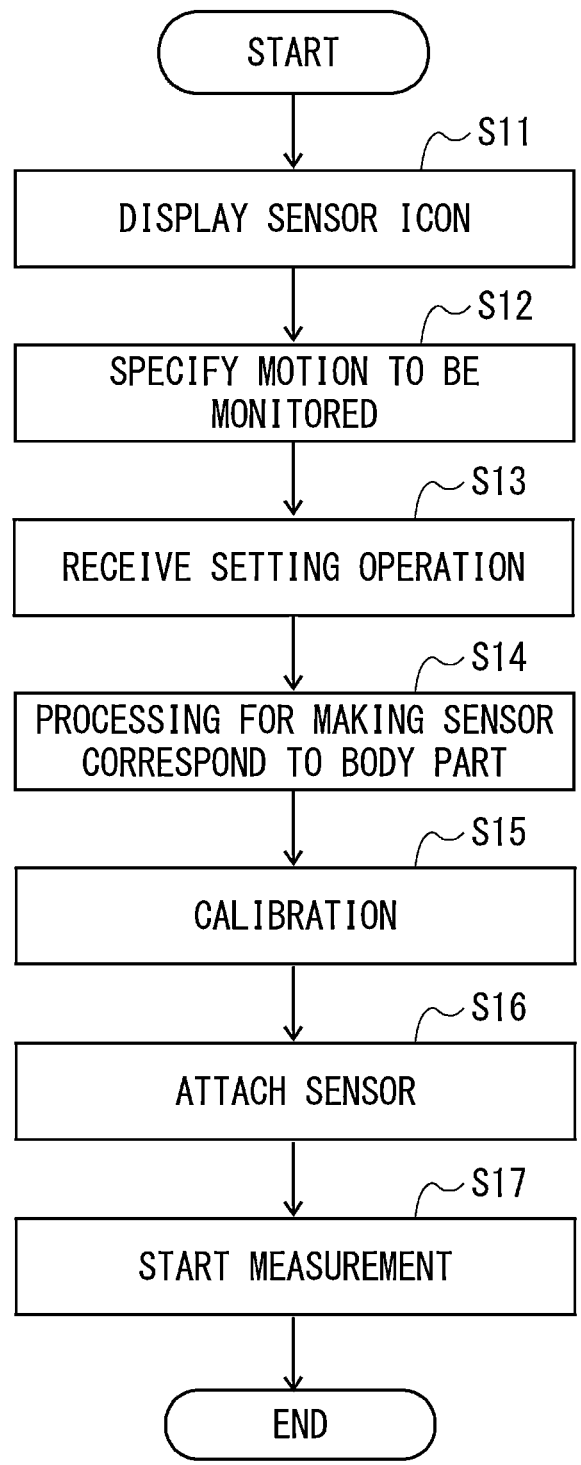
FIG. 6 is a flowchart showing operations performed by the motion state monitoring system shown in FIG. 1.

Next, operations performed by the motion state monitoring apparatus 10 will be described with reference to FIG. 6. FIG. 6 is a flowchart showing the operations performed by the motion state monitoring apparatus 10. As described above, it is assumed here that a bending and stretching motion of the right elbow of the subject P is monitored by the motion state monitoring apparatus 10. That is, a sensor is attached to each of the right upper arm (the body part p1) and the right forearm (the body part p2) of the subject P. Note that it is assumed that the motion to be monitored and the attachment position at which a sensor is to be attached are made to correspond to each other and stored in the storage unit 11.

First, the motion state monitoring apparatus 10 displays a plurality of sensor icons i21_1 to i21_11 respectively corresponding to a plurality of sensors on the display unit 12 (S11).

As shown in FIG. 5, the display unit 12 displays a display screen including the sensor icon display area S1 and the human body schematic diagram S2 showing the body parts to which the respective sensors are to be attached.

Next, the specification unit 13 of the motion state monitoring apparatus 10 specifies a motion to be monitored (S12). For example, the specification unit 13 may specify bending and stretching of the right elbow selected by a user as the motion to be monitored.

The display unit 12 may display the body part to which the sensor used to measure the specified motion to be monitored is to be attached. The display unit 12 highlights (by a color, flashing, shading, etc.) the right upper arm p1 and the right forearm p2 so that they are displayed in a display form different from those of other body parts p3 to p11 shown in the human body schematic diagram S2. That is, the right upper arm p1 and the right forearm p2 are displayed in a display form different from those of the other body parts p3 to p11 shown in the human body schematic diagram S2 of FIG. 5.

Further, in the motion state monitoring apparatus 10, a user, for example, drags and drops one sensor icon i21_1 selected from among the sensor icons i21_1 to i21_11 displayed in the sensor icon display area S1 onto the right upper arm p_1 in the human body schematic diagram S2. By doing the above, the reception unit 15 receives the setting operation (S13).

After that, the motion state monitoring apparatus 10 associates identification information of the sensor 21_1 corresponding to the sensor icon i21_1 with identification information of the right upper arm (the body part p1) of the subject P to which the sensor 21_1 is to be attached in accordance with the setting operation. As a result, the sensor 21_1 is made to correspond to the right upper arm (the body part p1) of the subject P (S14). Note that, similarly, the sensor icon i21_2 is dragged and dropped onto another body part (the right forearm (the body part p2)), and the sensor 21_2 is made to correspond to the right forearm (the body part p2) of the subject. That is, S12 and S13 in FIG. 6 may be repeated as many times as the number of body parts of the subject to which the sensors are to be attached.

After the sensor 21_1 is made to correspond to the body part p1 to which the sensor 21_1 is to be attached and the sensor 21_2 is made to correspond to the body part p2 to which the sensor 21_2 is to be attached, a calibration of the sensors 21_1 and 21_2 used to measure the motion to be monitored is subsequently performed (S15). A calibration is, for example, processing for measuring an output value (an error component) of a sensor in a standstill state, the sensor being used to measure a motion to be monitored, and subtracting the error component from a measured value. In this example, a calibration of at least the sensors 21_1 and 21_2 is performed. However, the calibration is not limited to being performed on the sensors used to measure the motion to be monitored, and may be performed on all the sensors 21_1 to 21_11, for example, before display processing of a sensor icon corresponding to the paired sensor.

After the calibration has been completed, the sensors 21_1 and 21_2 are attached to the subject P (Step S16). Then, the motion to be monitored is measured based on a result of detection by each of the sensors 21_1 and 21_2 (S17).

Further, the result of the calculation indicating the motion state of the "bending and stretching of the right elbow" can be determined by, for example, a difference between the result of detection by the sensor 21_1 attached to the right upper arm (the body part p1) of the subject P and the result of detection by the sensor 21_2 attached to the right forearm (the body part p2) of the subject P. The motion state monitoring apparatus 10 generates a result of the calculation indicating the motion state of the "bending and stretching of the right elbow" based on the result of detection by each of the sensors 21_1 and 21 2. The display unit 12 displays the details of the result of measurement (e.g., a graphed result of measurement).

As described above, the motion state monitoring system according to this embodiment displays an attachment body part made to correspond to a specified motion to be monitored on a human body schematic diagram. By doing so, it is possible to easily determine where an attachment position at which a sensor is to be attached is and then attach the sensor thereat.

Note that the order of processes performed by the motion state monitoring system 1 is not limited to the order of processes shown in FIG. 6. For example, a calibration may be performed before display processing of a sensor icon corresponding to the paired sensor.

When a motion to be monitored and an attachment position of a sensor are made to correspond to each other and stored in an external server or the like, the motion state monitoring apparatus 10 may temporarily receive information or the like from the external server or the like, and store the received information or the like in the storage unit 11 having a temporary storage function of the motion state monitoring apparatus 10.

The motion state monitoring apparatus 10 may be a PC or a server that is not necessarily a personal computer.

Further, in the present disclosure, it is possible to implement all or some of the processes performed by the motion state monitoring system 1 by causing a Central Processing Unit (CPU) to execute a computer program.

The above-described program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies, a CD-ROM, a Digital Versatile Disc (DVD), a Blu-ray (Registered Trademark) disc or other types of optical disc storage, a magnetic cassette, a magnetic tape, and a magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A motion state monitoring system configured to monitor a motion of a subject in accordance with a result of detection sent from each of a plurality of sensors attached to a plurality of respective body parts of a body of the subject, the motion state monitoring system comprising:
   a storage unit configured to store a motion to be monitored and an attachment position at which the sensor is to be attached, the motion being made to correspond to the attachment position;
   a display control unit configured to refer to the storage unit and display the attachment position at which the sensor is to be attached on a diagram showing a human body, the attachment position being determined in accordance with a specified motion to be monitored;
   a specification unit configured to extract a feature of a motion from a captured image of the subject using a machine learning model and specify a motion corresponding to the feature as the motion to be monitored,
   a processing unit configured to make the attachment position correspond to the sensor based on an operation input for the displayed attachment position,
   wherein the operation input is an operation input for dragging and dropping a sensor icon corresponding to the sensor onto the displayed attachment position from a sensor display area, that displays a plurality of sensors icons corresponding to different sensors, to a human body schematic diagram that has a plurality of body parts to which the respective sensors are to be attached,
   wherein the display control unit highlights the attachment body part made to correspond to the motion to be monitored so that it is displayed in a display form different from the other body parts,
   wherein the display control unit moves the human body schematic diagram based on the captured image of the subject.

2. The motion state monitoring system according to claim 1, further comprising a specification unit configured to specify the motion to be monitored in response to an operation input for a joint in the diagram showing a human body.

3. The motion state monitoring system according to claim 1, wherein when a plurality of motions to be monitored including a first motion to be monitored and a second motion to be monitored are specified, the display control unit displays a first attachment position determined in accordance with the first motion to be monitored and a second attachment position determined in accordance with the second motion to be monitored in display forms different from each other.

4. The motion state monitoring system according to claim 1, further comprising a specification unit configured to specify the motion to be monitored based on an attachment position history of the sensor.

5. A method for controlling a motion state monitoring system configured to monitor a motion of a subject in accordance with a result of detection sent from each of a plurality of sensors attached to a plurality of respective body parts of a body of the subject, the method comprising referring to a storage unit configured to store a motion to be monitored and an attachment position at which the sensor is to be attached, the motion being made to correspond to the attachment position, displaying the attachment position at which the sensor is to be attached on a diagram showing a human body, the attachment position being determined in accordance with a specified motion to be monitored, extracting a feature of a motion from a captured image of the subject using a machine learning model, specifying a motion corresponding to the feature as the motion to be monitored, making the attachment position correspond to the sensor based on an operation input for the displayed attachment position, wherein the operation input is an operation input for dragging and dropping a sensor icon corresponding to the sensor onto the displayed attachment position from a sensor display area, that displays a plurality of sensors icons corresponding to different sensors, to a human body schematic diagram that has a plurality of body parts to which the respective sensors are to be attached, wherein the display control unit highlights the attachment body part made to correspond to the motion to be monitored so that it is displayed in a display form different from the other body parts, wherein the display control unit moves the human body schematic diagram based on the captured image of the subject.

6. A non-transitory computer readable medium storing a control program for causing a computer to execute control processing in a motion state monitoring system configured to monitor a motion of a subject in accordance with a result of detection sent from each of a plurality of sensors attached to a plurality of respective body parts of a body of the subject, the control processing comprising referring to a storage unit configured to store a motion to be monitored and an attachment position at which the sensor is to be attached, the motion being made to correspond to the attachment position, displaying the attachment position at which the sensor is to be attached on a diagram showing a human body, the attachment position being determined in accordance with a specified motion to be monitored, extracting a feature of a motion from a captured image of the subject using a machine learning model, specifying a motion corresponding to the feature as the motion to be monitored, making the attachment position correspond to the sensor based on an operation input for the displayed attachment position, wherein the operation input is an operation input for dragging and dropping a sensor icon corresponding to the sensor onto the displayed attachment position from a sensor display area, that displays a plurality of sensors icons corresponding to different sensors, to a human body schematic diagram that has a plurality of body parts to which the respective sensors are to be attached, wherein the display control unit highlights the attachment body part made to correspond to the motion to be monitored so that it is displayed in a display form different from the other body parts, wherein the display control unit moves the human body schematic diagram based on the captured image of the subject.

* * * * *